(12) United States Patent
Noguchi (10) Patent No.: US 10,849,285 B2
(45) Date of Patent: *Dec. 1, 2020

(54) EMITTER AND DRIP IRRIGATION TUBE

(71) Applicant: Enplas Corporation, Saitama (JP)

(72) Inventor: Koji Noguchi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 206 days.

This patent is subject to a terminal disclaimer.

(21) Appl. No.: 16/061,026

(22) PCT Filed: Nov. 11, 2016

(86) PCT No.: PCT/JP2016/083531
§ 371 (c)(1),
(2) Date: Jun. 11, 2018

(87) PCT Pub. No.: WO2017/098858
PCT Pub. Date: Jun. 15, 2017

(65) Prior Publication Data
US 2018/0359962 A1     Dec. 20, 2018

(30) Foreign Application Priority Data

Dec. 9, 2015    (JP) ................................ 2015-240098

(51) Int. Cl.
*A01G 25/02*     (2006.01)
*A01G 25/00*     (2006.01)

(52) U.S. Cl.
CPC ...... *A01G 25/023* (2013.01); *A01G 2025/006* (2013.01); *Y02A 40/237* (2018.01)

(58) Field of Classification Search
CPC .......... A01G 25/023; A01G 2025/006; Y02A 40/237
(Continued)

(56) References Cited

U.S. PATENT DOCUMENTS 6,027,048 A     2/2000    Mehoudar
6,464,152 B1 *   10/2002    Bolinis ................ A01G 25/023
                                                                  239/542
(Continued)

FOREIGN PATENT DOCUMENTS

| | | |
|---|---|---|
| EP | 2248414 A1 | 11/2010 |
| JP | 2010-046094 A | 3/2010 |
| WO | 2015080127 A1 | 6/2015 |

OTHER PUBLICATIONS

International Search Report from International Application No. PCT/JP2016/083531 dated Dec. 13, 2016.
(Continued)

*Primary Examiner* — Qingzhang Zhou
(74) *Attorney, Agent, or Firm* — Brundidge & Stanger, P.C.

(57) ABSTRACT

This emitter (120) comprises: a first flow rate adjustment unit which adjusts the flow rate of an irrigation liquid according to the deformation of a first diaphragm (160); and a second flow rate adjustment unit which adjusts the amount of irrigation liquid ejected (discharged) from the emitter (120) according to the deformation of a second diaphragm (170). The first diaphragm (160) has a projection spaced apart by a space from a hole which is a flow path for the irrigation liquid. The projection has an inverted truncated cone shape and is formed so that the space widens as the projection goes into the hole.

3 Claims, 7 Drawing Sheets

(58) Field of Classification Search
USPC ...... 239/33.1, 542, 547, 562, 566, 569, 571, 239/570
See application file for complete search history.

(56) References Cited

U.S. PATENT DOCUMENTS 8,998,113 B2 * 4/2015 Keren ................. A01G 25/023
239/542
2016/0286740 A1 10/2016 Kidachi

OTHER PUBLICATIONS

First Examination Report dated Mar. 18, 2020 from Indian Application No. 201817021072, 6 pages.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped to the soil from the drip irrigation tube. The drip irrigation method has been increasingly attracting attention in recent years since the method can minimize the consumption rate of the irrigation liquid.

Normally, the drip irrigation tube includes a tube provided with a plurality of through holes for discharging irrigation liquid, and a plurality of emitters (also called "drippers") for discharging irrigation liquid from respective through holes. Emitters which are joined on the inner wall surface of a tube, and emitters which are pierced into the tube from the external side of the tube are known.

The former emitter includes, for example, a first member having an intake port for intake of irrigation liquid, a second member having a discharging port for discharging irrigation liquid, and a film member disposed between the first member and the second member. The emitter is configured by stacking the first member, the film member and the second member in this order, and when this emitter is joined on the inner wall surface of the tube, the combined first and second members are partially directly joined on the tube. In this emitter, when the intake port is opened and closed with the film member that moves toward or away from the valve seat part, the irrigation liquid enters the emitter and flows through a pressure reduction channel between the intake port and the discharging port, and is then discharged from the discharging port (see, for example, PTL 1).

CITATION LIST

Patent Literature

PTL 1
Japanese Patent Application Laid-Open No. 2010-046094

SUMMARY OF INVENTION

Technical Problem

In general, a drip irrigation tube is long, and is provided with a plurality of emitters. In view of this, it is desirable to produce emitters at low cost. In addition, in some situation, drip irrigation tubes are disposed on or near the Earth's surface. When heated at the Earth's surface, the irrigation liquid in the drip irrigation tube might be raised to a temperature of, for example, approximately 40 to 50° C., which is far greater than the intended temperature (e.g. 20° C.).

The manufacturing cost of the emitter disclosed in PTL 1 can be reduced by producing the emitter with a single common resin material such as polyethylene. In the emitter made of such a common resin material, however, when the temperature of the irrigation liquid is higher than the intended temperature, the film member is deformed beyond the assumption. Consequently, limitation of the discharge rate of the irrigation liquid might be started before the intended timing, resulting in an insufficient discharge rate of the irrigation liquid.

An object of the present invention is to provide an emitter and a drip irrigation tube that can discharge irrigation liquid at a desired discharge rate regardless of the temperature.

Solution to Problem

An emitter according to an embodiment of the present invention is configured to be joined on an inner wall surface of a tube for carrying irrigation liquid at a position corresponding to a discharging port of the tube for communicating between inside and outside of the tube, and configured to quantitatively discharge the irrigation liquid in the tube out of the tube from the discharging port, the emitter being made of a resin, the emitter including: an intake part configured to communicate with the inside of the tube when the emitter is joined on the tube; a pressure reducing channel part communicated with the intake part, and configured to form a pressure reducing channel for carrying the irrigation liquid while reducing a pressure of the irrigation liquid; a first flow rate adjusting part communicated with the pressure reducing channel part, and configured to adjust a flow rate of the irrigation liquid in accordance with a pressure of the irrigation liquid in the tube; a second flow rate adjusting part communicated with the pressure reducing channel part and the first flow rate adjusting part, and configured to adjust the flow rate of the irrigation liquid in accordance with the pressure of the irrigation liquid in the tube; and a discharging part communicated with the second flow rate adjusting part, and configured to face the discharging port when the emitter is joined on the tube. The first flow rate adjusting part includes a valve seat, a communication hole opening at the valve seat and communicated with the second flow rate adjusting part, and a diaphragm part having flexibility and separated from the valve seat, the diaphragm part being configured to be brought close to the valve seat when the pressure of the irrigation liquid in the tube is exerted on the diaphragm part, and the diaphragm part includes a protrusion configured to be disposed at an opening of the communication hole such that a gap is formed between the protrusion and the opening of the communication hole, the protrusion having a shape with which, the closer the diaphragm part is to the valve seat, the more deeply the protrusion is inserted to the communication hole and the wider the gap.

A drip irrigation tube according to an embodiment of the present invention includes: a tube including a discharging port for discharging irrigation liquid; and the emitter. The emitter is joined on an inner wall surface of the tube at a position corresponding to the discharging port.

Advantageous Effects of Invention

According to the present invention, it is possible to provide an emitter and a drip irrigation tube that can discharge irrigation liquid at a desired discharge rate regardless of the temperature.

DESCRIPTION OF EMBODIMENTS

Figure 1A:
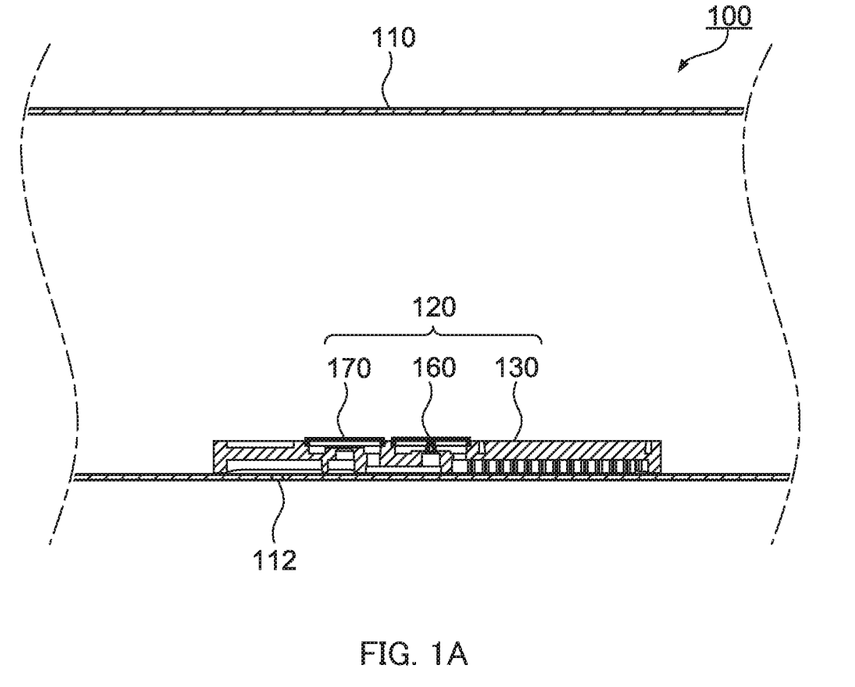
FIG. 1A is a sectional view along an axial direction of a drip irrigation tube according to an embodiment of the present invention.
Figure 1B:
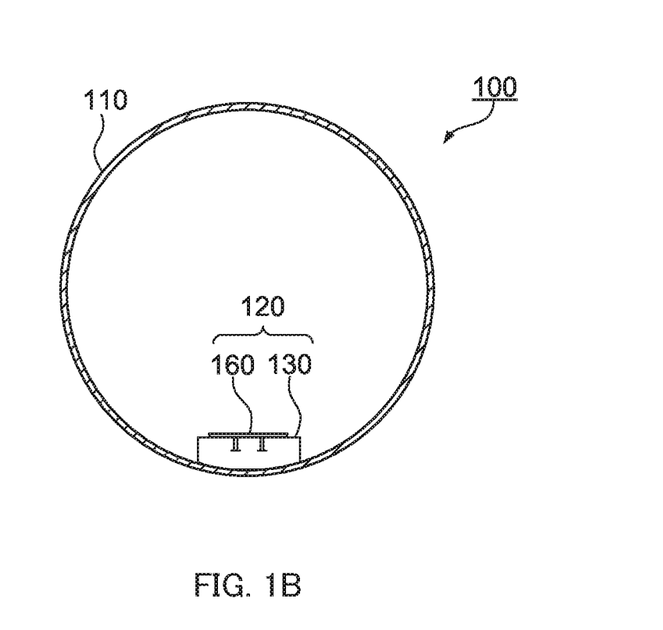
FIG. 1B is a sectional view in a direction perpendicular to the axis direction of the drip irrigation tube.

FIG. 1A is a sectional view along the axial direction of a drip irrigation tube according to an embodiment of the present invention, and FIG. 1B is a sectional view perpendicular to the axial direction of the drip irrigation tube. As illustrated in FIG. 1A and FIG. 1B, drip irrigation tube 100 includes tube 110 including discharging port 112 for discharging irrigation liquid, and emitter 120 joined on the inner wall surface of tube 110 at a position corresponding to discharging port 112.

Tube 110 is a pipe for carrying irrigation liquid. Normally, tube 110 is made of a resin, and the material of tube 110 is, for example, polyethylene such as linear low-density polyethylene and high-density polyethylene. The cross-sectional shape and the cross-sectional area of tube 110 in the direction perpendicular to the axis direction may be set as appropriate as long as emitter 120 can be installed inside tube 110.

In the wall of tube 110, a plurality of discharging ports 112 for discharging irrigation liquid are formed at a predetermined interval (e.g., 200 to 500 mm) in the axial direction of tube 110. The diameter of the opening of discharging port 112 may be set as appropriate as long as the irrigation liquid can be discharged at a desired flow rate, and is, for example, 1.5 mm. Emitters 120 are joined at respective positions corresponding to discharging ports 112 on the inner wall surface of tube 110.

Emitter 120 is joined on the inner wall surface of tube 110. Emitter 120 is joined to tube 110 by a publicly known joining method, for example. Examples of the joining method include bonding with an adhesive agent, and welding and/or fusing of the resin material of emitter 120 or tube 110.

Figure 2A:
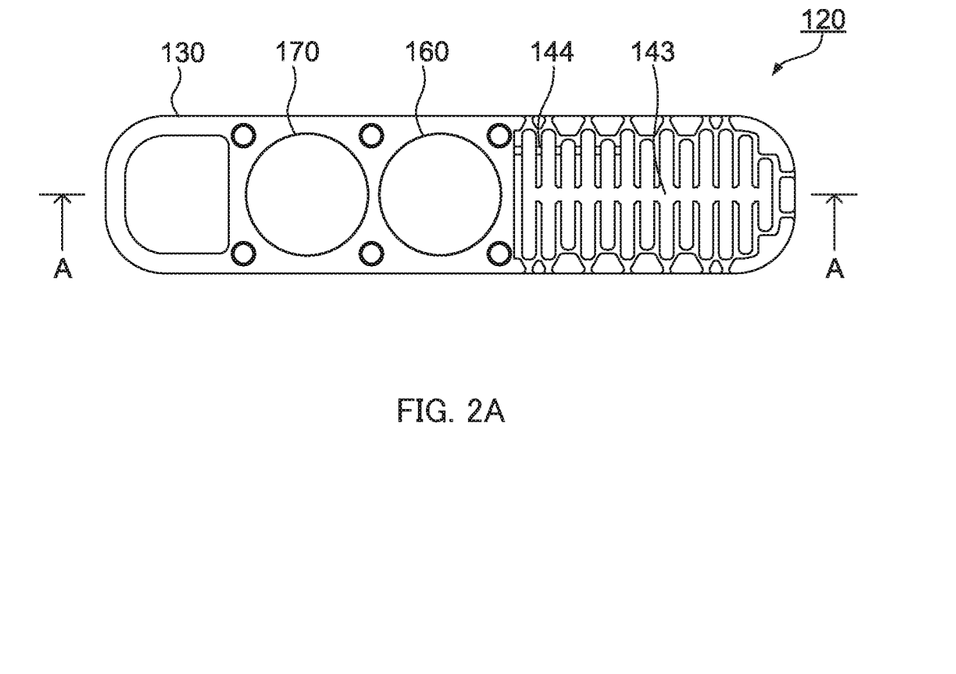
FIG. 2A is a plan view of an emitter according to the embodiment of the present invention.
Figure 2B:
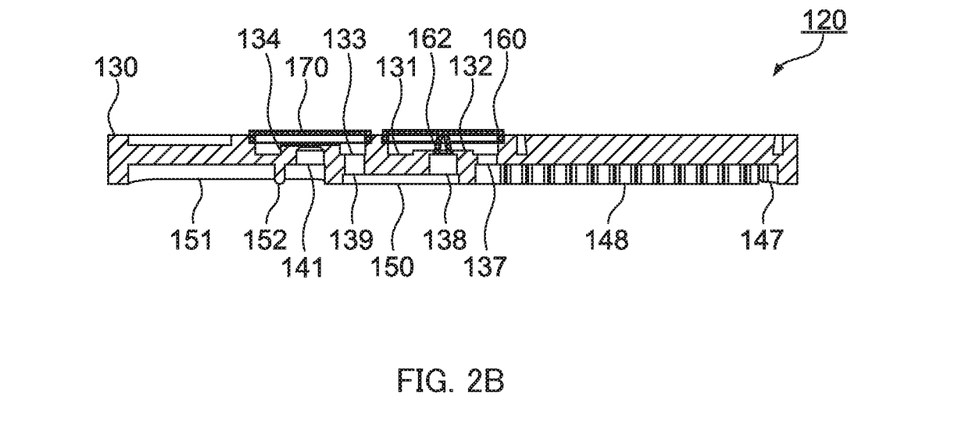
FIG. 2B is a cross-sectional view of the emitter taken along line A-A of FIG. 2A.

FIG. 2A is a plan view of emitter 120, and FIG. 2B is a cross-sectional view of emitter 120 taken along line A-A of FIG. 2A. The size and the shape of emitter 120 may be set as appropriate as long as a desired function can be ensured. For example, the planar shape of emitter 120 is a substantially rectangular shape with R-chamfered (round chamfered) four corners, and emitter 120 has a long side length of 25 mm, a short side length of 8 mm, and a height of 2.5 mm.

As illustrated in FIG. 2A and FIG. 2B, emitter 120 includes emitter main body 130, and first diaphragm part 160 and second diaphragm part 170 combined with emitter main body 130.

Figure 3A:
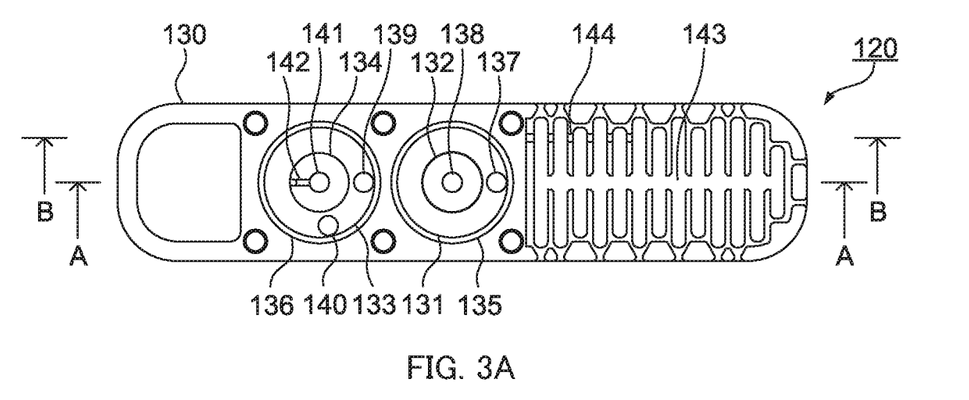
FIG. 3A is a plan view of an emitter main body of the embodiment of the present invention.
Figure 3B:
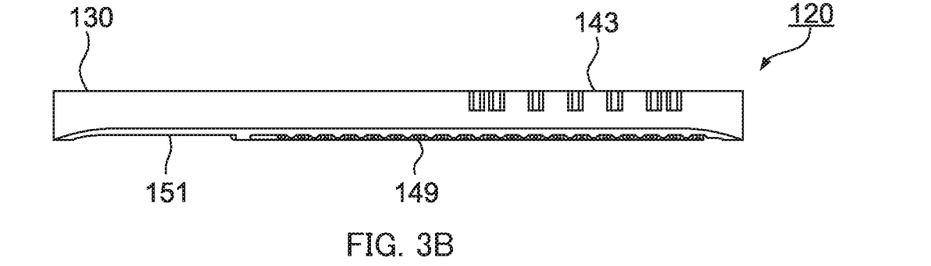
FIG. 3B is a front view of the emitter main body.
Figure 3C:
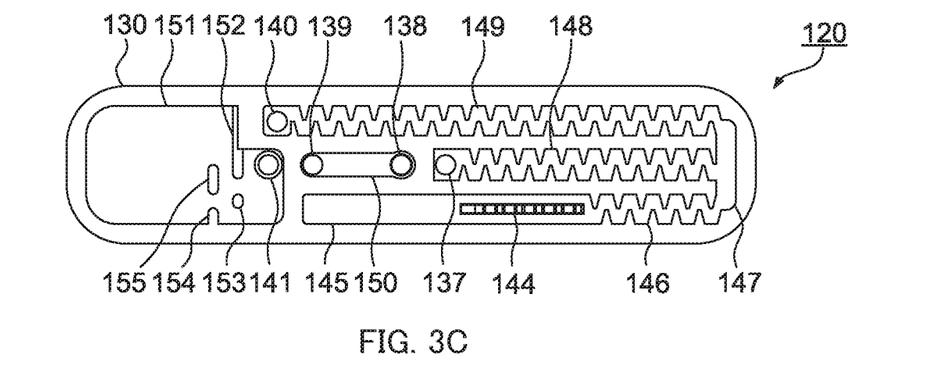
FIG. 3C is a bottom view of the emitter main body.
Figure 3D:
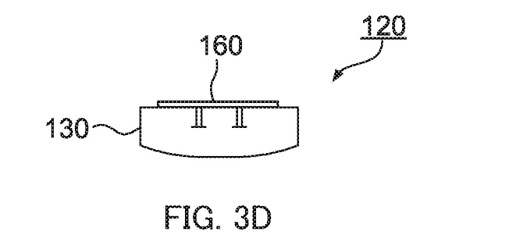
FIG. 3D is a right side view of the emitter main body.
Figure 4A:
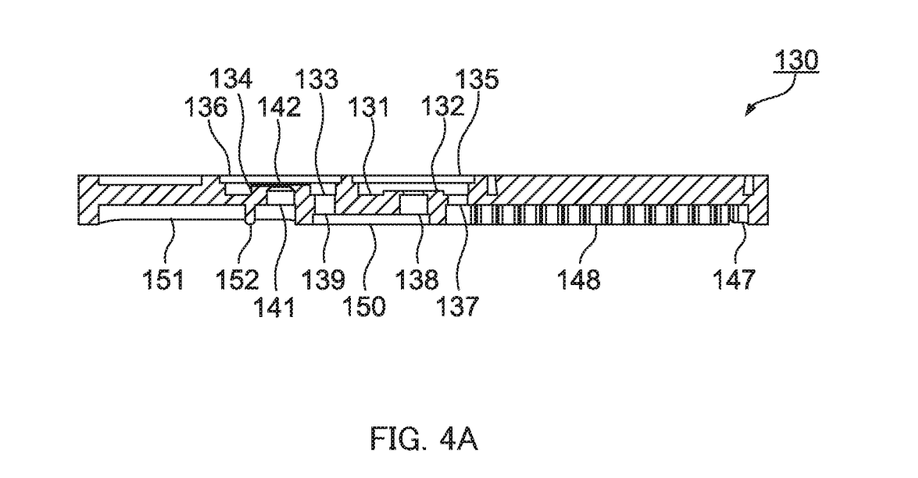
FIG. 4A is a cross-sectional view of the emitter main body taken along line A-A of FIG. 3A.
Figure 4B:
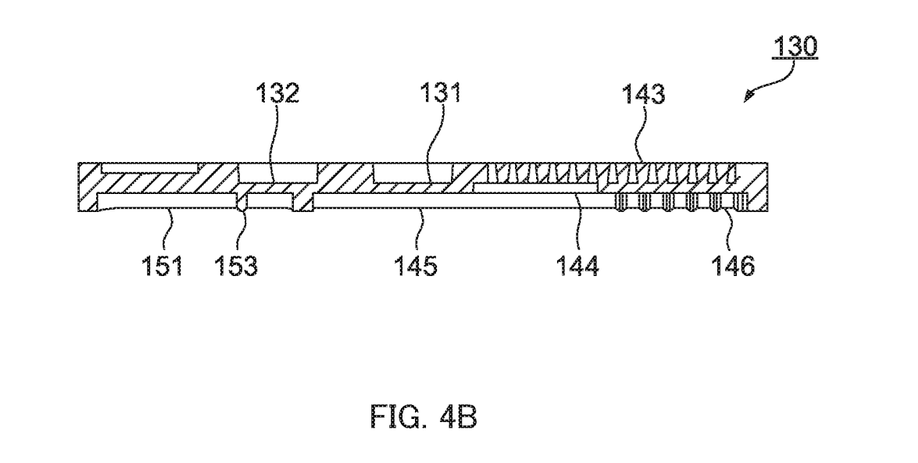
FIG. 4B is a cross-sectional view of the emitter main body taken along line B-B of FIG. 3A.

FIG. 3A is a plan view of emitter main body 130, FIG. 3B is a front view of emitter main body 130, FIG. 3C is a bottom view of emitter main body 130, and FIG. 3D is a right side view of emitter main body 130. In addition, FIG. 4A is a cross-sectional view of emitter main body 130 taken along line A-A of FIG. 3A, and FIG. 4B is a cross-sectional view of emitter main body 130 taken along line B-B of FIG. 3A.

Emitter main body 130 is molded with a resin material, and has flexibility. Examples of the resin material include polyethylene such as linear low-density polyethylene and high-density polyethylene, polypropylene, silicone, and industrial materials having rubber elasticity, and the examples of the industrial materials having the rubber elasticity include elastomer and rubber.

Emitter main body 130 has a substantially rectangular planar shape, and the shape of the bottom surface of emitter main body 130 is a convex surface that matches the inner wall surface of tube 110. Recesses, grooves, protrusions and through holes are disposed as appropriate in the top surface and the bottom surface of emitter main body 130.

Specifically, emitter main body 130 includes, on its top surface side, first circular recess 131 opening at a center portion of the top surface, first columnar part 132 further protruding from a center portion of first circular recess 131, second circular recess 133 opening at the top surface on one end side of emitter main body 130 relative to first circular recess 131 in the longitudinal direction, second columnar part 134 further protruding from a center portion of second circular recess 133, annular first cutout part 135 that is formed at the opening of first circular recess 131 and is larger than the opening, and annular second cutout part 136 that is formed at the opening of second circular recess 133 and is larger than the opening. Each of first and second circular recesses 131 and 133 has a circular planar shape.

In addition, emitter main body 130 includes first hole 137 opening at first circular recess 131, second hole 138 opening at a center portion of first columnar part 132, third hole 139 and fourth hole 140 opening at second circular recess 133, fifth hole 141 opening at a center portion of second columnar part 134, and groove 142 that communicates between the periphery of the top surface of second columnar part 134 and fifth hole 141. Each of first to fifth holes 137 to 141 has a circular planar shape.

The distance (depth) from the top surface of emitter main body 130 to the bottom surface of first circular recess 131 and the distance (depth) from the top surface of emitter main body 130 to the bottom surface of second circular recess 133 are equal to each other.

First columnar part 132 protrudes from the bottom surface of first circular recess 131, and second columnar part 134 protrudes from second circular recess 133. The heights of first columnar part 132 and second columnar part 134 are smaller than the depths of first circular recess 131 and second circular recess 133, respectively, and the height of first columnar part 132 is smaller than the height of second columnar part 134. Each of the top surface of first columnar part 132 and the top surface of second columnar part 134 is a flat surface, and has a circular shape in plan view.

One groove 142 is formed on the top surface of second columnar part 134. Groove 142 has a linear planar shape, and the depth of groove 142 from the top surface of second columnar part 134 is constant. The bottom surface of groove 142 is parallel with the top surface.

In addition, emitter main body 130 includes filter part 143 and slit 144 disposed in filter part 143 on the other end side relative to first circular recess 131.

Filter part 143 is micro protrusions and recessions formed in the top surface of emitter main body 130, and roughly speaking, filter part 143 includes a U-shaped first groove extending along the other end edge of emitter main body 130, a plurality of second grooves extending outward from the first groove so as to communicate between the first groove and the outside, and a plurality of third grooves extending inward from the first groove. Mainly, the third grooves separately extend in the short direction of emitter main body 130, and some of the third grooves communicate with each other.

Slit 144 is a through hole opening in one side part of emitter main body 130 and having a slender shape extending along the longitudinal direction of emitter main body 130. On the top surface side of emitter main body 130, slit 144 opens at the bottoms of the plurality of third grooves of filter part 143.

Further, emitter main body 130 includes, on its bottom surface side, linear groove 145 extending along the longitudinal direction at one end part of the surface, first pressure reducing channel part 146 continuously connected with the other end side of groove 145, linear groove 147 continuously connected with the other end side of first pressure reducing channel part 146 and extending in the short direction of emitter main body 130, second pressure reducing channel part 148 continuously connected with one end side of groove 147 and extending toward the one end side at a center part of the bottom surface, third pressure reducing channel part 149 continuously connected with one end side of groove 147 and extending toward the one end side at the other side part the bottom surface, linear groove 150 extending along the longitudinal direction on the one end side relative to second pressure reducing channel part 148 on the bottom surface, and recess 151 formed on the one end side relative to groove 147, groove 150 and third pressure reducing channel part 149 on the bottom surface.

Each of first pressure reduction channel part 146, second pressure reduction channel part 148 and third pressure reduction channel part 149 is a groove having a zigzag planar shape. The zigzag shape is a shape in which projections, each having a substantially triangular prism shape, are alternately disposed along the longitudinal direction from the side surfaces of the pressure reduction channel part, for example. In plan view, the projections are disposed such that the tip of each projection does not cross the central axis between the side surfaces, for example.

Slit 144 opens at the bottom surface of groove 145. First hole 137 opens at one end portion of second pressure reduction channel part 148. Second hole 138 opens at the other end portion of groove 150, and third hole 139 opens at one end portion of groove 150. Fourth hole 140 opens at one end portion of third pressure reduction channel part 149. Fifth hole 141 opens at the other end portion of recess 151.

Recess 151 extends to one end portion of the bottom surface. Recess 151 includes first to fourth protrusions 152 to 155. First protrusion 152 is extended along the short direction and disposed at a position where first protrusion 152 overlaps fifth hole 141 in the longitudinal direction. Second protrusion 153 is disposed at a position on the extension line of first protrusion 152 in the short direction such that second protrusion 153 is separated from first protrusion 152 and the side wall of recess 151. Third protrusion 154 is protruded from the side wall of recess 151 along the short direction and disposed at a position where, in the longitudinal direction, third protrusion 154 overlaps the gap between second protrusion 153 and the side wall of recess 151. Fourth protrusion 155 is protruded along the extension line of third protrusion 154 in the short direction, and is disposed at a position where, in the longitudinal direction, fourth protrusion 155 overlaps the gap between first protrusion 152 and the side wall of second protrusion 153.

Figure 5A:
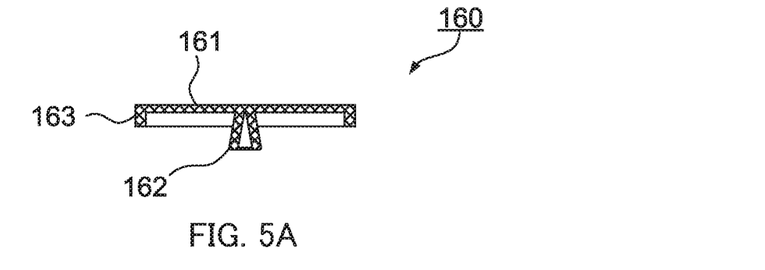
FIG. 5A is a sectional view of a first diaphragm part of the embodiment of the present invention.
Figure 5B:
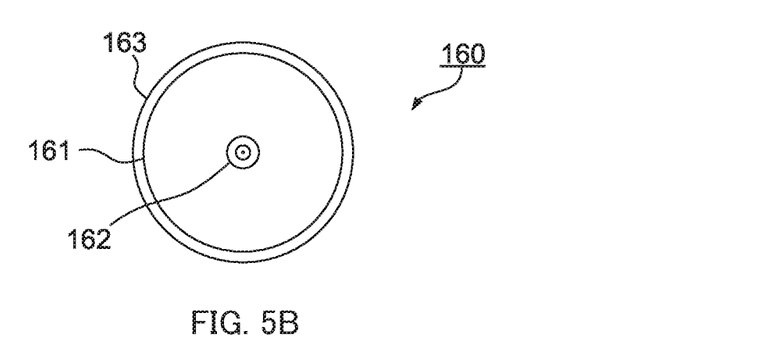
FIG. 5B is a bottom view of the first diaphragm part.
Figure 5C:
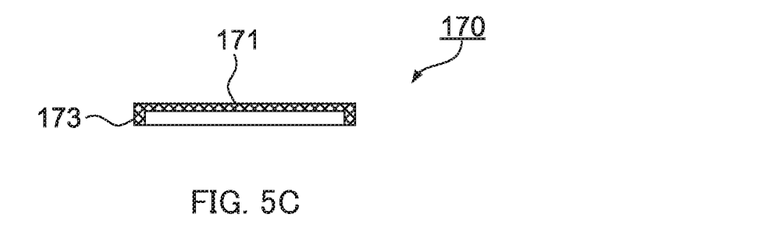
FIG. 5C is a sectional view of a second diaphragm part of the embodiment of the present invention.
Figure 5D:
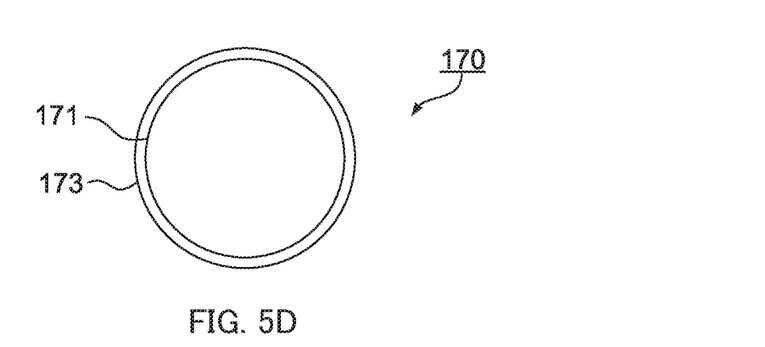
FIG. 5D is a bottom view of the second diaphragm part.

FIG. 5A is a sectional view of first diaphragm part 160, and FIG. 5B is a bottom view of first diaphragm part 160. FIG. 5C is a sectional view of second diaphragm part 170, and FIG. 5D is a bottom view of second diaphragm part 170.

First diaphragm part 160 and second diaphragm part 170 are also made of a resin and have flexibility. Examples of the resin material include polyethylene such as linear low-density polyethylene and high-density polyethylene, polypropylene, silicone, and industrial materials having rubber elasticity, and the examples of the industrial materials having rubber elasticity include elastomer and rubber. The resin material of first diaphragm part 160 may or may not be identical to that of emitter main body 130. Also, the resin material of the first diaphragm part 160 may or may not be identical to that of second diaphragm part 170.

First diaphragm part 160 includes film part 161 having a circular planar shape, protrusion 162 raised from a center portion of film part 161, and peripheral wall part 163 raised from a peripheral portion of film part 161. In plan view, the diameter of film part 161 is identical to the diameter of first circular recess 131, and the outer diameter of peripheral wall part 163 is identical to the diameter of first cutout part 135. In addition, the height of peripheral wall part 163 is slightly greater than the depth of first cutout part 135.

Protrusion 162 has an inverted truncated cone external shape, and the diameter of the cross-sectional shape of protrusion 162 in the plane direction gradually increases in the direction away from film part 161. The protruding height of protrusion 162 from film part 161 is set such that the protruding end portion of protrusion 162 slightly enters the opening of second hole 138 when first diaphragm part 160 is disposed so as to close first circular recess 131. In addition, protrusion 162 has an annular planar shape on the bottom surface side, and the outer diameter of the protruding end portion of protrusion 162 in plan view is slightly smaller than the diameter of the opening of second hole 138. The center portion of protrusion 162 is a space having an inverted cone shape, and the thickness of the outer periphery wall of protrusion 162 is substantially uniform.

Second diaphragm part 170 includes film part 171 having a circular planar shape and peripheral wall part 173 raised from a peripheral portion of film part 171. In plan view, the diameter of film part 171 is identical to the diameter of second circular recess 133, and the diameter of peripheral wall part 173 is identical to the diameter of second cutout part 136. In addition, the height of peripheral wall part 173 is slightly larger than the depth of second cutout part 136.

Emitter 120 is produced by fitting first diaphragm part 160 into first cutout part 135 with protrusion 162 and peripheral wall part 163 facing first circular recess 131 side, and by fitting second diaphragm part 170 into second cutout part 136 with peripheral wall part 173 facing second circular recess 132 side. Each circular recess has the cutout part at the opening thereof, and each diaphragm part has the peripheral wall part, and thus the film part of each diaphragm part can be surely and easily disposed at a position where the film part is separated from the top surface of the columnar part by a desired distance.

First diaphragm part 160 and second diaphragm part 170 may be joined to emitter main body 130. As described above, the joining can be performed by welding or fusing of a resin material, or by bonding with an adhesive agent.

Filter part 143, slit 144 and groove 145 define an intake part that communicates with the interior of tube 110 when emitter 120 is joined to tube 110.

In addition, first circular recess 131, first columnar part 132, first hole 137, second hole 138 and first diaphragm part 160 form a first flow rate adjusting part communicated with second pressure reducing channel part 148 and configured to adjust the flow rate of the irrigation liquid in accordance with the pressure of the irrigation liquid in tube 110. The top surface of first columnar part 132 corresponds to a valve seat, and film part 161 of first diaphragm part 160 is brought close to the valve seat. Second hole 138 corresponds to a communication hole opening at the valve seat and communicated with a second flow rate adjusting part described later.

First diaphragm part 160, which has flexibility and is separated from the valve seat, is disposed and configured to be brought close to the valve seat when the pressure of the irrigation liquid in tube 110 is exerted on first diaphragm part 160. Then, first diaphragm part 160 includes protrusion 162 configured to be disposed such that a gap is formed between protrusion 162 and the opening of the communication hole. Protrusion 162 has an inverted truncated cone-shape with which, the closer first diaphragm part 160 is to the valve seat, the more deeply protrusion 162 is inserted to the communication hole and the wider the gap.

Further, second circular recess 133, second columnar part 134, third to fifth holes 139 to 141, groove 142 and second diaphragm part 170 form a second flow rate adjusting part communicated with third pressure reducing channel part 149 and the first flow rate adjusting part, and configured to adjust the flow rate of the irrigation liquid in accordance with the pressure of the irrigation liquid in tube 110. The top surface of second columnar part 134 corresponds to a discharging side valve seat on which film part 171 of second diaphragm part 170 can sit. Fifth hole 141 corresponds to a discharging side communication hole opening at the discharging side valve seat and communicated with a discharging part described later. Second diaphragm part 170 corresponds to a discharging side diaphragm part that has flexibility and is separated from the discharging side valve seat. The discharging side diaphragm part is brought close to the discharging side valve seat when the pressure of the irrigation liquid in tube 110 is exerted on the discharging side diaphragm part.

As described above, the bottom surface of emitter main body 130 is joined on the inner wall surface of tube 110. In this manner, drip irrigation tube 100 illustrated in FIG. 1A is produced. Discharging port 112 may be formed in advance in tube 110 before emitter 120 is joined, or may be formed after emitter 120 is joined.

When the recess and the groove formed on the bottom surface of emitter main body 130 are sealed with the inner wall surface of tube 110, the discharging part and the channel of the irrigation liquid inside emitter 120 are formed. That is, first to third pressure reducing channel parts 146, 148 and 149 form the first to third pressure reducing channels, respectively, which are communicated with the intake part and configured to carry irrigation liquid while reducing the pressure of the irrigation liquid. Groove 147 forms a branch channel branching from the first pressure reducing channel to the second and third pressure reducing channels, and groove 150 forms a communication channel for supplying, to the second flow rate adjusting part, irrigation liquid discharged from the first flow rate adjusting part. In addition, recess 151 forms a discharging part communicated with the second flow rate adjusting part and facing discharging port 112.

An overview of flow of irrigation liquid in drip irrigation tube 100 is described. The irrigation liquid supplied into tube 110 passes through slit 144 through the groove of filter part 143 so as to be supplied to groove 145. The irrigation liquid is water, liquid fertilizer, agricultural chemical, or a mixture thereof, for example. The floating matters in the irrigation liquid are not allowed to enter the groove of filter part 143, and accordingly the irrigation liquid from which the floating matters are removed is supplied to groove 145 (or into emitter 120) through slit 144.

The irrigation liquid supplied to groove 145 is supplied to the branch channel through the first pressure reducing channel while the pressure of the irrigation liquid is reduced. A part of the irrigation liquid supplied to the branch channel is supplied to the first flow rate adjusting part through the second pressure reducing channel while the pressure of the irrigation liquid is further reduced, and supplied to the second flow rate adjusting part through the communication channel. In addition, the remaining part of the irrigation liquid supplied to the branch channel is supplied to the second flow rate adjusting part through the third pressure reducing channel while the pressure of the irrigation liquid is further reduced. The irrigation liquid supplied to the second flow rate adjusting part is supplied to the discharging part at a flow rate which is adjusted in accordance with pressure of the irrigation liquid in tube 110, and discharged from discharging port 112.

When in use, foreign matters such as soil and plant roots might enter drip irrigation tube 100 from discharging port 112. Entry of the foreign matters is inhibited by third protrusion 154 and fourth protrusion 155 disposed in recess 151, and further by first protrusion 152 and second protrusion 153 disposed on fifth hole 141 side. It is thus possible to prevent variation in flow rate such as stoppage of discharging of the irrigation liquid and reduction in flow rate of the irrigation liquid due to the entry of the foreign matters.

Figure 6A:
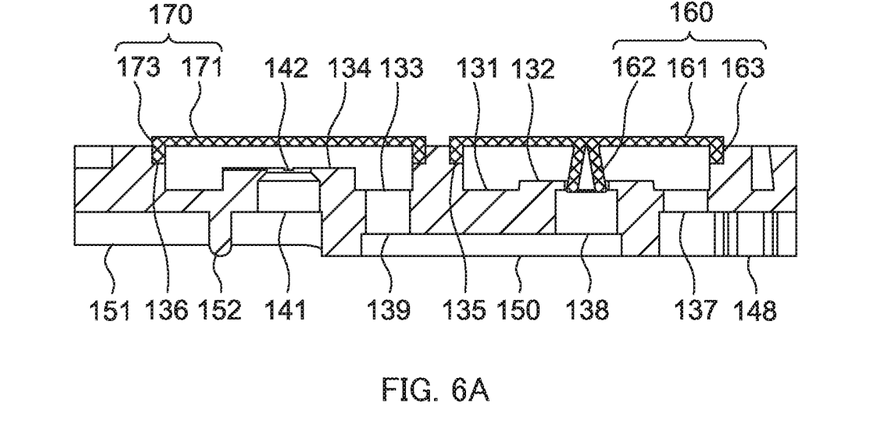
FIG. 6A is a sectional view schematically illustrating the first and second flow rate adjusting parts of the emitter under a condition of normal temperature and a low pressure.
Figure 6B:
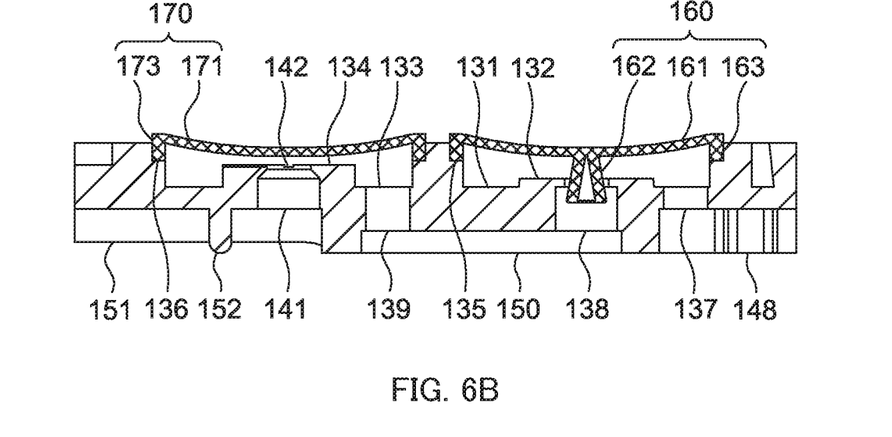
FIG. 6B is a sectional view schematically illustrating the first and second flow rate adjusting parts of the emitter under a condition of normal temperature and an intermediate pressure.
Figure 6C:
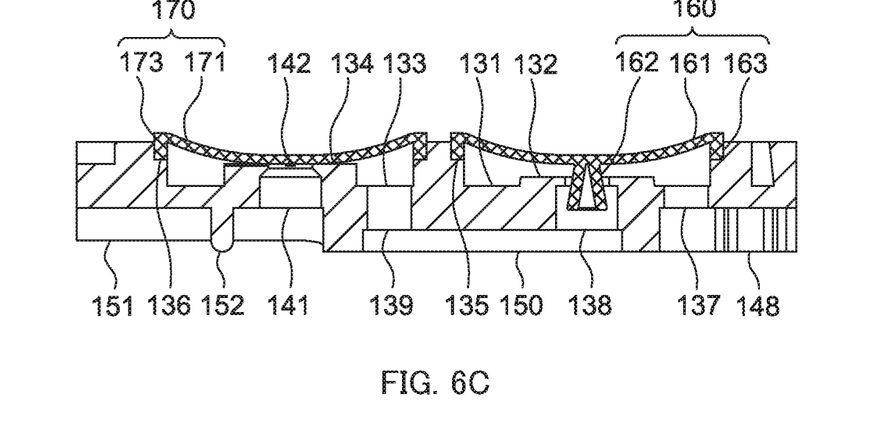
FIG. 6C is a sectional view schematically illustrating the first and second flow rate adjusting parts of the emitter under a condition of normal temperature and a high pressure.

Next, the control of the discharge rate of the irrigation liquid by emitter 120 at normal temperature (e.g. 20° C.) is described. FIG. 6A is a sectional view schematically illustrating the first flow rate adjusting part and the second flow rate adjusting part of emitter 120 under a condition of normal temperature and a low pressure, FIG. 6B is a sectional view schematically illustrating the first flow rate adjusting part and the second flow rate adjusting part of emitter 120 under a condition of normal temperature and an intermediate pressure, and FIG. 6C is a sectional view schematically illustrating the first flow rate adjusting part and the second flow rate adjusting part of emitter 120 under a condition of normal temperature and a high pressure.

When the temperature of the irrigation liquid is normal and the liquid pressure is at 0 MPa, the irrigation liquid does not flow inside emitter 120, and therefore no pressure difference between the inside and the outside of emitter 120 is caused. Accordingly, as illustrated in FIG. 6A, neither first diaphragm part 160 nor second diaphragm part 170 is deformed.

When the temperature of the irrigation liquid is normal and the liquid pressure is at an intermediate value (e.g. 0.05 MPa) (a condition of normal temperature and an intermediate pressure), the irrigation liquid flows inside tube 110 and inside emitter 120.

In the first flow rate adjusting part, a pressure difference is caused between the pressure of the irrigation liquid in tube 110 (outer liquid pressure) and the pressure of the irrigation liquid in first circular recess 131 (inner liquid pressure). The inner liquid pressure becomes lower than the outer liquid pressure as a result of the pressure drop in the second pressure reducing channel, and, normally, the pressure difference in the first flow rate adjusting part increases in accordance with increase in outer liquid pressure.

With the pressure difference, first diaphragm part 160 is deflected as illustrated in FIG. 6B. The greater the deflection of first diaphragm part 160, the more deeply protrusion 162 of first diaphragm part 160 is inserted to second hole 138, and the wider the gap between the opening of second hole 138 and protrusion 162. As a result, in the first flow rate adjusting part, when the pressure difference is increased, the pressure drop of the irrigation liquid at the gap is reduced.

The irrigation liquid is supplied to the second flow rate adjusting part not only from the first flow rate adjusting part, but also through the third pressure reducing channel. The inner liquid pressure in the second flow rate adjusting part is determined by the pressure drop at the first flow rate adjusting part and the pressure drop at the third pressure reducing channel.

As illustrated in FIG. 6B, second diaphragm part 170 is deflected by the pressure difference between the irrigation liquid in tube 110 and the irrigation liquid in second circular recess 133. The greater the pressure difference, the greater the deflection of second diaphragm part 170, the closer second diaphragm part 170 is to the opening of fifth hole 141, and the smaller the gap between the opening of fifth hole 141 and second diaphragm part 170. As a result, in the second flow rate adjusting part, when the pressure difference is increased on the upstream side of the second flow rate adjusting part, the flow of the irrigation liquid through the gap is suppressed, whereby the flow rate of the irrigation liquid is adjusted.

When the temperature of the irrigation liquid is normal and the liquid pressure is at an upper limit value for use (e.g. 0.1 MPa) (a condition of normal temperature and a high pressure), the deflection of first diaphragm part 160 is maximized as illustrated in FIG. 6C. Meanwhile, in emitter 120, the gap between the opening of second hole 138 and protrusion 162 in the first flow rate adjusting part is maximized. As a result, the inner liquid pressure of the second flow rate adjusting part at second diaphragm part 170 is maximized.

At this time, second diaphragm part 170 is largely deflected by the pressure difference between the outer liquid pressure and the inner liquid pressure in the above-mentioned manner, and brought into contact with the top surface of second columnar part 132. As a result, fifth hole 141 is communicated with second circular recess 133 through groove 142. Accordingly, when the pressure of the irrigation liquid is at the upper limit pressure for use, the irrigation liquid is discharged from discharging port 112 at a predetermined flow rate that is determined by the inner liquid pressure of the second flow rate adjusting part and the groove 142.

Figure 7A:
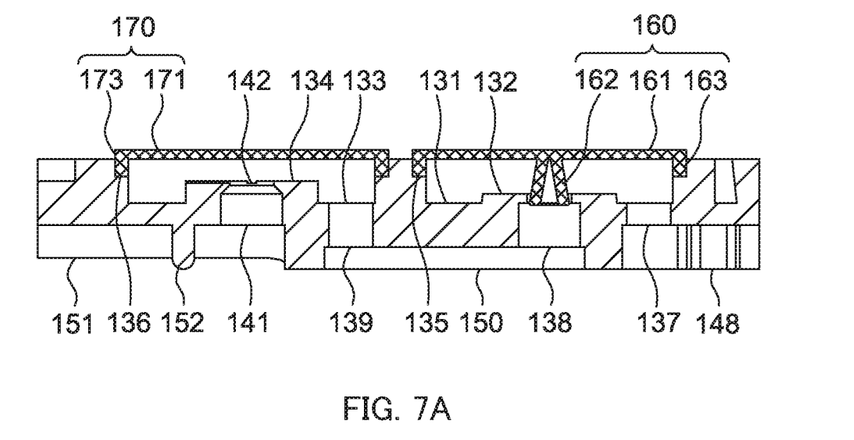
FIG. 7A is a sectional view schematically illustrating the first and second flow rate adjusting parts of the emitter under a condition of a high temperature and a low pressure.

Next, the control of the discharge rate of the irrigation liquid by emitter 120 at a high temperature (e.g. 40 to 50° C.) is described. FIG. 7A is a sectional view schematically illustrating the first flow rate adjusting part and the second flow rate adjusting part of emitter 120 under a condition of a high temperature and a low pressure, FIG. 7B is a sectional view schematically illustrating the first flow rate adjusting part and the second flow rate adjusting part of emitter 120 under a condition of a high temperature and an intermediate pressure, and FIG. 7C is a sectional view schematically illustrating the first flow rate adjusting part and the second flow rate adjusting part of emitter 120 under a condition of a high temperature and a high pressure.

When the temperature of the irrigation liquid is high and the liquid pressure is at 0 MPa, no irrigation liquid flows inside emitter 120 as under the condition of a normal temperature and 0 MPa, and therefore no pressure difference between the inside and the outside of emitter 120 is caused, and accordingly, neither first diaphragm part 160 nor second diaphragm part 170 is deformed as illustrated in FIG. 7A.

When the temperature of the irrigation liquid is high and the liquid pressure is at an intermediate value (e.g. 0.05 MPa) (a condition of a high temperature and an intermediate pressure), first diaphragm part 160 and second diaphragm part 170 are deformed by the pressure difference. It should be noted that, since each of first diaphragm part 160 and second diaphragm part 170 is made of a resin as described above, first diaphragm part 160 and second diaphragm part 170 are more largely deflected under the condition of a high temperature and an intermediate pressure than under the condition of normal temperature and an intermediate pressure.

Figure 7B:
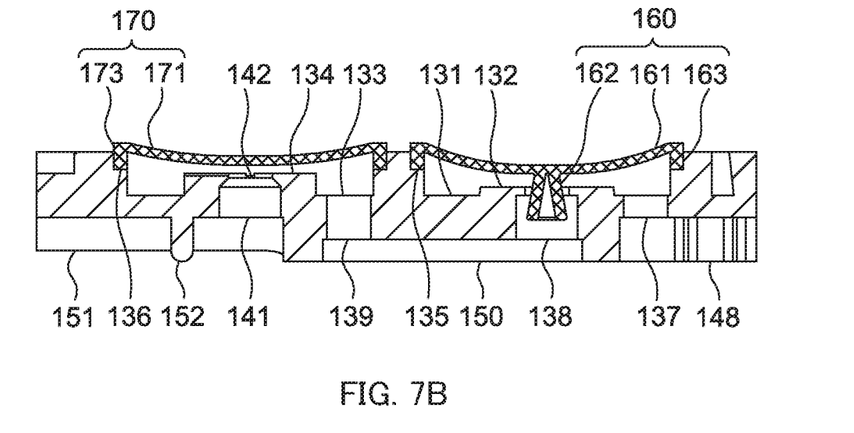
FIG. 7B is a sectional view schematically illustrating the first and second flow rate adjusting parts of the emitter under a condition of a high temperature and an intermediate pressure.
Figure 7C:
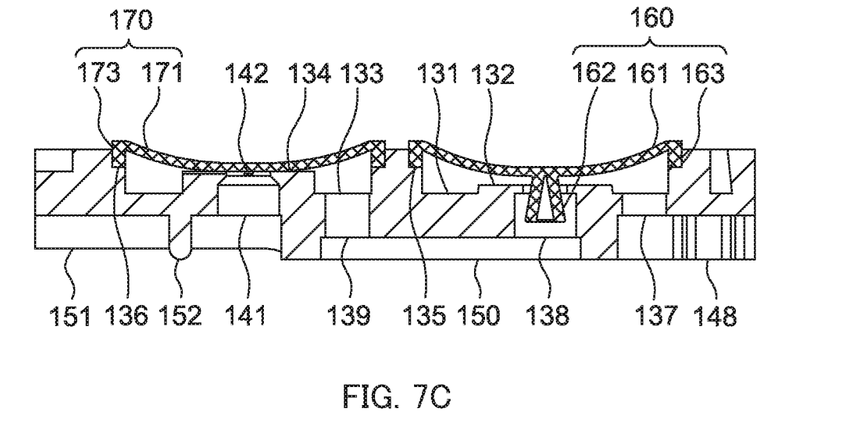
FIG. 7C is a sectional view schematically illustrating the first and second flow rate adjusting parts of the emitter under a condition of a high temperature and a high pressure.

Accordingly, first diaphragm part 160 is more largely deflected under the condition of a high temperature and an intermediate pressure than under the condition of normal temperature and an intermediate pressure as illustrated in FIG. 7B. Accordingly, protrusion 162 is more deeply inserted to second hole 138 and the gap between the opening of second hole 138 and protrusion 162 is wider under the condition of a high temperature and an intermediate pressure than under the condition of normal temperature and an intermediate pressure. As a result, the pressure drop at the gap becomes smaller.

Also, second diaphragm part 170 is more largely deflected under the condition of a high temperature and an intermediate pressure than under the condition of normal temperature and an intermediate pressure. However, regarding the pressure drop on the upstream side of the second flow rate adjusting part, the pressure drop at the first flow rate adjusting part is smaller under the condition of a high temperature and an intermediate pressure than under a condition of normal temperature and an intermediate pressure. Accordingly, the inner liquid pressure of the second flow rate adjusting part is higher, and the pressure difference in the second flow rate adjusting part is smaller under the condition of a high temperature and an intermediate pressure than under the condition of normal temperature and an intermediate pressure.

As a result, the deformation of second diaphragm part 170 is suppressed, and the deformation of second diaphragm part 170 under the condition of a high temperature and an intermediate pressure is limited to a deformation approximately equal to the deformation of second diaphragm part 170 under the condition of normal temperature and an intermediate pressure. Accordingly, even under the condition of a high temperature and an intermediate pressure, the size of the gap between the opening of fifth hole 141 and second diaphragm part 170 is approximately equal to the size of the gap under the condition of normal temperature and an intermediate pressure, and as a result, the irrigation liquid is discharged from discharging port 112 at a flow rate substantially equal to the flow rate of the irrigation liquid under the condition of normal temperature and an intermediate pressure.

When the temperature of the irrigation liquid is high and the liquid pressure is at an upper limit value for use (e.g. 0.1 MPa) (a condition of a high temperature and a high pressure), the deflection of first diaphragm part 160 is maximized as with the deflection under the condition of normal temperature and a high pressure as illustrated in FIG. 7C. Meanwhile, in emitter 120, the gap between the opening of second hole 138 and protrusion 162 in the first flow rate adjusting part is maximized. As a result, the inner liquid pressure of the second flow rate adjusting part at second diaphragm part 170 is maximized.

At this time, second diaphragm part 170 is largely deflected by the pressure difference between the outer liquid pressure and the inner liquid pressure in the above-mentioned manner, and brought into contact with the top surface of second columnar part 132. As a result, fifth hole 141 is communicated with second circular recess 133 through groove 142. Accordingly, when the pressure of the irrigation liquid is at the upper limit pressure for use, the irrigation liquid is discharged from discharging port 112 at a predetermined flow rate that is determined by the inner liquid pressure of the second flow rate adjusting part and the groove 142.

Each of first and second diaphragm parts 160 and 170 is easily deflected under the condition of a high temperature and a high pressure than under the condition of normal temperature and a high pressure. Meanwhile, the greater the deflection of first diaphragm part 160, the wider the gap between the opening of second hole 138 and protrusion 162 in the first flow rate adjusting part, the smaller the pressure drop at the gap, the greater the inner liquid pressure of the second flow rate adjusting part, and the smaller the pressure difference in the second flow rate adjusting part.

As a result, the deformation of second diaphragm part 170 is suppressed, and the deformation of second diaphragm part 170 under the condition of a high temperature and a high pressure is limited to a deflection approximately equal to the deformation under the condition of normal temperature and a high pressure. With emitter 120 designed such that the pressure difference under the condition of a high temperature and a high pressure and the pressure difference under the condition of normal temperature and a high pressure are substantially equal to each other, the flow rate adjustment operation of the second flow rate adjusting part can be similarly performed under conditions that are identical in their pressure but are different in their temperature. Accordingly, the flow rate of the irrigation liquid from discharging port 112 under the condition of a high temperature and a high pressure is substantially the same as the flow rate of the irrigation liquid under the condition of normal temperature and a high pressure.

As is clear from the above description, emitter 120 includes the intake part that is communicated with the interior of tube 110 when emitter 120 is joined to tube 110; first to third pressure reducing channel parts 146, 148 and 149 communicated with the intake part and configured to form a pressure reducing channel for carrying the irrigation liquid supplied to the intake part while reducing the pressure of the irrigation liquid; the first flow rate adjusting part communicated with second pressure reducing channel part 148 and configured to adjust the flow rate of the irrigation liquid in accordance with the pressure of the irrigation liquid in tube 110; the second flow rate adjusting part communicated with third pressure reducing channel part 149 and the first flow rate adjusting part and configured to adjust the flow rate of the irrigation liquid in accordance with the pressure of the irrigation liquid in tube 110; and the discharging part communicated with the second flow rate adjusting part and configured to face discharging port 112 when emitter 120 is joined to tube 110.

In addition, the first flow rate adjusting part includes the top surface of first columnar part 132; second hole 138 opening at the top surface and communicated with the second flow rate adjusting part; and first diaphragm part 160 that has flexibility and is separated from the top surface such that, when the pressure of the irrigation liquid in tube 110 is exerted on first diaphragm part 160, first diaphragm part 160 comes close to the top surface. First diaphragm part 160 includes protrusion 162 that is disposed such that a gap is formed between protrusion 162 and the opening of second hole 138. Protrusion 162 has an inverted truncated conical shape that does not make contact with second hole 138, that is, a shape with which the gap widens as first diaphragm part 160 comes close to the top surface.

In addition, drip irrigation tube 100 includes tube 110 including discharging port 112 for discharging irrigation liquid, and emitter 120 joined on the inner wall surface of tube 110 at a position corresponding to discharging port 112.

With the above-mentioned configuration, the greater the deformation of first diaphragm part 160 in the first flow rate adjusting part, the smaller the pressure drop in second hole 138, and the higher the inner liquid pressure in the second flow rate adjusting part, thereby easing the limitation on the flow rate in the second flow rate adjusting part. Accordingly, the discharge rate of emitter 120 is controlled at a desired rate regardless of the temperature even under a condition of an intermediate pressure where the deformation amount of diaphragm parts 160 and 170 tends to vary in accordance with the outer liquid pressure. Therefore, emitter 120 can discharge the irrigation liquid at a desired discharge rate regardless of the temperature even when the temperature of the irrigation liquid is high to a certain degree, and drip irrigation tube 100, which includes emitter 120, also can discharge the irrigation liquid at a desired discharge rate regardless of the temperature even when the temperature of the irrigation liquid is high to a certain degree.

While first diaphragm part 160 may be made of a resin material identical to that of second diaphragm part 170, first diaphragm part 160 made of a resin material with which first diaphragm part 160 is more easily bent at a high temperature than second diaphragm part 170 is further effective in view of reducing the difference between the discharge rate of the irrigation liquid under a condition of a high pressure and normal temperature and the discharge rate of the irrigation liquid under a condition of a high pressure and a high temperature.

In the case where second diaphragm part 170 and first diaphragm part 160 are made of the same resin material, second diaphragm part 170 more easily makes contact with the top surface of second columnar part 134 as the temperature increases provided that the pressure applied thereto is the same. In the case where the temperature dependency of the deformation of second diaphragm part 170 is lower than that of first diaphragm part 160, the contact timing of second diaphragm part 170 with second columnar part 134 at a high temperature can be delayed. Such a configuration is further effective in view of easily and precisely designing second diaphragm part 170 whose contact timing with the top surface of second columnar part 134 at a high temperature is the same or nearly the same as at normal temperature.

The bending property of the resin material in accordance with temperature change can be set by determining the bending elastic modulus of the resin material in the assumed temperature range of the irrigation liquid, for example. The bending elastic modulus can be determined based on publicly known standards such as JIS K7171:2008 (ISO 178: 2001) or JIS K7127:1999 (ISO 527-3:1995), for example. For example, the resin material of second diaphragm part 170, the thicknesses of film parts 161 and 171, and the external shape of protrusion 162 can be determined based on the relationship between the deformation of first diaphragm part 160 under the liquid pressure and the increase in the gap area between second hole 138 and protrusion 162, on the relationship between the increase in the liquid pressure and the reduction in the distance between second diaphragm part 170 (film part 171) and the top surface of second columnar part 134 at the time of the increase in the liquid pressure, and the like, and the above-mentioned relationships can be calculated by computer simulations, determined by experiments using trial products, and the like, for example.

The external shape of protrusion 162 is not limited to the inverted truncated conical shape, and may be any shape as long as the gap between protrusion 162 and second hole 138 widens as first diaphragm part 160 comes close to the top surface of second columnar part 134. For example, the cross-sectional shape of the protrusion along the plane direction may be a polygonal shape, or a noncircular shape such as an ellipse shape. In addition, the external shape of the protrusion in vertical-cross section may be a temple-bell shape (a shape with a convex curve gradually expanding outward along the axis direction of the protrusion), or, conversely, a shape with a concave curve gradually expanding along the axis direction of the protrusion. Further, the planar shape of the opening of the second hole may be a polygonal shape or a noncircular shape that is independent of the cross-sectional shape of the protrusion in the plane direction.

In addition, a so-called wedge wire structure in which the side walls of the first to third grooves in filter part 143 are undercut parts is preferable since such a configuration is further advantageous in suppressing clogging at filter part 143.

This application is entitled to and claims the benefit of Japanese Patent Application No. 2015-240098 dated Dec. 9, 2015, the disclosure of which including the specification, drawings and abstract is incorporated herein by reference in its entirety.

INDUSTRIAL APPLICABILITY

According to the present invention, it is possible to provide, with high productivity, an emitter which can drop liquid with an appropriate rate by the pressure of the liquid to be dropped regardless of the temperature of the liquid to be dropped. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
112 Discharging port
120 Emitter
130 Emitter main body
131 First circular recess
132 First columnar part
133 Second circular recess
134 Second columnar part
135 First cutout part
136 Second cutout part
137 First hole
138 Second hole
139 Third hole
140 Fourth hole
141 Fifth hole
142, 145, 147, 150 Groove
143 Filter part
144 Slit
146 First pressure reducing channel part
148 Second pressure reducing channel part
149 Third pressure reducing channel part
151 Recess
152 First protrusion
153 Second protrusion
154 Third protrusion
155 Fourth protrusion
160 First diaphragm part
161, 171 Film part
162 Protrusion
163, 173 Peripheral wall part
170 Second diaphragm part

The invention claimed is:

1. An emitter configured to be joined on an inner wall surface of a tube for carrying irrigation liquid at a position corresponding to a discharging port of the tube for communicating between an inside and an outside of the tube, and configured to quantitatively discharge the irrigation liquid in the tube out of the tube from the discharging port, the emitter being made of a resin, the emitter comprising:
   an intake part configured to communicate with the inside of the tube when the emitter is joined on the tube;
   a pressure reducing channel part communicated with the intake part, and configured to form a pressure reducing channel for carrying the irrigation liquid while reducing a pressure of the irrigation liquid;
   a first flow rate adjusting part communicated with the pressure reducing channel part, and configured to adjust a flow rate of the irrigation liquid in accordance with a pressure of the irrigation liquid in the tube;
   a second flow rate adjusting part communicated with the pressure reducing channel part and the first flow rate adjusting part, and configured to adjust the flow rate of the irrigation liquid in accordance with the pressure of the irrigation liquid in the tube; and
   a discharging part communicated with the second flow rate adjusting part, and configured to face the discharging port when the emitter is joined on the tube,
   wherein the first flow rate adjusting part includes
      a valve seat, a communication hole opening at the valve seat and communicated with the second flow rate adjusting part, and a diaphragm part having flexibility and separated from the valve seat, the diaphragm part being configured to be brought close to the valve seat when the pressure of the irrigation liquid in the tube is exerted on the diaphragm part, and wherein the diaphragm part includes a protrusion configured to be disposed at an opening of the communication hole such that a gap is formed between the protrusion and the opening of the communication hole, the protrusion having a shape with which, the closer the diaphragm part is to the valve seat, the more deeply the protrusion is inserted to the communication hole and the wider the gap between the protrusion and the opening of the communication hole.

2. The emitter according to claim 1, wherein:

the second flow rate adjusting part includes:

a discharging side valve seat, a discharging side communication hole opening at the discharging side valve seat and communicated with the discharging part, and a discharging side diaphragm part having flexibility and separated from the discharging side valve seat, the discharging side diaphragm part being configured to be brought close to the discharging side valve seat when the pressure of the irrigation liquid in the tube is exerted on the discharging side diaphragm part; and the diaphragm part is made of a resin material that allows the diaphragm part to be more easily bent than the discharging side diaphragm part at a high temperature.

3. A drip irrigation tube, comprising:

the tube including the discharging port for discharging irrigation liquid; and the emitter according to claim 1.

* * * * *